Sept. 28, 1943.   T. C. MORRIS   2,330,233
MOLDED ARTICLE AND METHOD OF MAKING THE SAME Filed Dec. 9, 1939

INVENTOR.
Thomas C. Morris
By his attorney
Victor Cobb

Patented Sept. 28, 1943

2,330,233

UNITED STATES PATENT OFFICE 2,330,233

MOLDED ARTICLE AND METHOD OF MAKING THE SAME

Thomas C. Morris, Belmont, Mass., assignor to B. B. Chemical Co., Boston, Mass., a corporation of Massachusetts Application December 9, 1939, Serial No. 308,503

15 Claims. (Cl. 18—55)

This invention relates to molded articles and their manufacture and will be described with respect to the manufacture of a heel made essentially of a thermosetting resin and finely divided fibrous material.

According to one feature of the present invention, there is provided a molded article and a method of making it, said article comprising a core or center of cured resin and fibrous material and a shell consisting largely of resin. It is frequently desired to apply a lacquer to a molded article, the fibrous component of which is bonded by a cured resin, and since lacquers do not adhere firmly to surfaces made up largely of such a resin, another feature relates to the dissemination throughout the surface of such a molded article of a substance which increases the bonding power of the lacquer. The illustrated molded article is a heel made by mixing the fibrous material with solid finely divided thermosetting resin, making from this mixture, without substantially curing the resin, a lightly compacted, bibulous intermediate article having the relative proportions of the finished heel but ordinarily of somewhat larger dimensions, coating the intermediate article with additional uncured resin, a filler, and a substance which will act in the finished heel to improve the bonding power of the lacquer with which the heel is to be coated, and subjecting the coated intermediate article to conditions of temperature and pressure sufficient to reduce it to final shape and to cure the resin. The resulting heel may be readily lacquered. An uncured or substantially uncured resin is a resin of the thermosetting type in that stage at which it will show plastic flow at temperatures and pressures below those commonly used in molding.

Referring now to the accompanying drawing.

Figure 1:
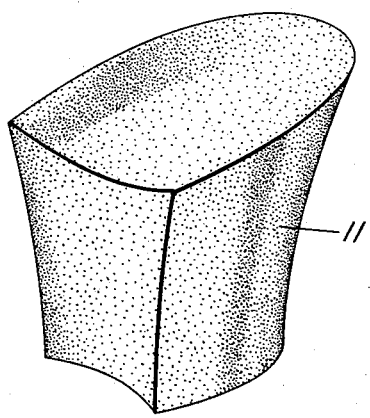
Fig. 1 is a perspective of a coated intermediate article ready to be molded to final shape.
Figure 2:
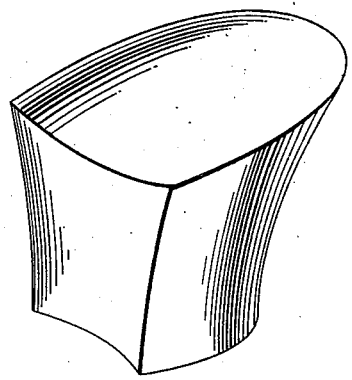
Fig. 2 is a perspective of a molded, lacquered heel.
Figure 3:
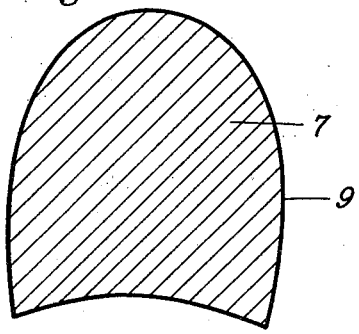
Fig. 3 is a diagrammatic representation on a somewhat enlarged scale of a cross-section of an unlacquered heel showing more particularly its shell and core.

The heel herein shown has a core or center 7 of particles of wood flour or sawdust bonded together by a resin of the phenol-aldehyde type in a shell 9 consisting of a mixture of the phenol-aldehyde resin, a filler and a substance which will act to increase the bonding power of the lacquer.

Because the resin is the comparatively costly ingredient of such a molded heel, it is desirable that the content of resin be kept as low as possible. There are, however, reasons other than cost for employing a low resin content. A heel made of resin and a compressible resilient material, such as wood flour which contains a relatively large proportion of resin, is heavy. Into such a heel it is difficult or impossible to drive nails; and, even if nails can be driven into it without splitting or checking it, the material of which the heel is made, having in it no compressible cells, or an insufficient number of compressible cells such as are present for example in a piece of wood, cannot be compressed or at least not sufficiently compressed by the entering nails, and consequently the material of the heel is forced up locally around the points of entry of the nails. However, even if the proportion of resin to fibrous material is reasonably low, there is a further condition which will militate against successful nailing, namely, the presence in the particles of the fibrous material of a considerable amount of hard, cured resin. Such a condition may be produced either (1) by mixing the material with the uncured resin while the resin is in liquid form, for example while it is in solution, or (2) by mixing the dry material with a dry, uncured resin which becomes liquid at its curing temperature. In either case, before the resin is finally cured in the curing mold, the resin has more or less impregnated the particles of the fibrous material, and when the curing is complete the cells of the fibrous material are to a considerable extent filled with the hard, cured resin. Thus, not only should a comparatively small proportion of resin be used, but the uncured resin should be one which does not liquefy but merely becomes highly viscous when subjected to its curing temperature and thus does not impregnate the particles of the fibrous material to any considerable extent. Such a resin can conveniently be made in two stages, an illustrative example being given below.

For the first stage the following ingredients are used:

| | |
|---|---:|
| Phenol Tech. 82°...............pounds.. | 7 |
| 37% formaldehyde in water solution..do.... | 4.55 |
| Concentrated sulphuric acid.......grams.. | 31.8 |
| Water..............................do.... | 31.8 |
| Calcium hydroxide..................do.... | 108 |

The sulphuric acid and the water are mixed together and are referred to below as the sulphuric acid solution. The phenol and the sulphuric acid solution are poured into a resin kettle, which is steam-jacketed and furnished with a reflux condenser and an agitator. The contents of the kettle are heated to 105° C. The formaldehyde solution is poured in slowly, the pouring taking about 40 minutes. The reaction begins at once and continues for about one hour. During this time, heat is generated so that the kettle will remain at about 95° C. without any steam heat. The product is tested to find out when the phenol-formaldehyde reaction is complete, the completion being indicated by the body or viscosity of the product. When the test is satisfactory, a partial vacuum is created in the kettle and the water is removed, thus lowering the temperature of the resin very quickly. The temperature drops within five minutes after the removal of the water is begun. When the temperature reaches 65° to 70° C. the calcium hydroxide is added to neutralize the acid and provide an excess of alkali. The temperature is kept at from 65° to 70° C. by the steam heat in the jacket. When most of the water has been removed, the temperature will start to rise. The steam is then turned on and the temperature is raised to 125° C. The testing of the product referred to above takes place on a hot plate at the temperature at which the resin is finally to be cured in the curing mold, for example, at a temperature of about 150° C., until a resin, which is highly viscous at that temperature, is obtained. As has been explained above, a resin which is relatively viscous at the temperature at which it is cured, is necessary to avoid impregnation by the resin of the particles of the fibrous material when the molding powder, which comprises a mixture of powdered resin and fibrous material, is later subjected to heat and pressure in the curing mold. When the resin, which is the product of this first stage, cools, it solidifies and is ground to a fine powder.

For the second stage the following ingredients are used:

| | Pounds |
|---|---|
| Ground resin (the product of the first stage) | 100 |
| Hexamethylene tetramine | 10 |
| Zinc stearate | 2 |

These ingredients are put in a ball mill and ground until from 95% to 100% of the product will pass through a 200-mesh screen. This product, which will be referred to hereafter as the compounded resin or the uncured resin, can be converted into a hard, insoluble, infusible substance by heat, the zinc stearate serving as a lubricant for the heated mold in which the curing of the resin finally takes place. Although one specific phenol-formaldehyde resin has been described above, it should be understood that a suitable phenol-formaldehyde resin may be otherwise prepared, that substituted phenols likewise may be employed, and that any suitable thermosetting resin having the desired qualities may be used, such for example as urea-aldehyde resins or thiourea-aldehyde resins or mixtures of the two last-named resins.

An uncured resin having been prepared by this or any suitable process, a molding powder is made which consists, if a nailable article is to be made, of from 5-35 parts by weight of uncured resin and 95-65 parts by weight of a fibrous material, such as wood flour or sawdust. It has been found advisable to use a wood flour or sawdust which does not contain too great a proportion of fine particles, i. e. particles which will pass through a 100-mesh screen, nor should a substantial part of the material be so coarse as not to pass through a 10-mesh screen. A preferred material is one all of which will pass through a 40-mesh screen, but will be retained on a 100-mesh screen, although a material of somewhat wider limits may be used without materially affecting the quality of the finished article. The wood flour and the resin are mixed dry, for example, in a tumbling mill. Although dry mixing takes place, it should be understood that the wood flour is preferably not dessicated before mixing it with the resin and has a small moisture content which ordinarily is in the neighborhood of 6% of weight.

Less than 10% of resin produces an article which is not sufficiently impervious to moisture for some uses, for example for use as a heel on a shoe which is to be worn outdoors, but may be adequate for indoor use, for example as the heel of a slipper. An article of 7% resin content has sufficient strength, if not exposed to much moisture, to be used for the manufacture of many articles. More than 35% resin produces a heel which tends to split or crack when top lift attaching slugs are driven into it. The proportion of resin used will be varied according to the properties desired in the finished article, the resin content of a heel for wear outdoors being preferably about 15% by weight and the heel having a specific gravity of about .84.

It has been stated above that the finished heel consists of a core of finely divided fibrous particles bonded together with a cured resin, and a shell consisting largely of cured resin, said shell being preferably one to which a coating of finishing material or lacquer will adhere. In order to produce such a heel, as well as one the surface of which is smooth and free from pits, there is first made an intermediate article. A measured amount of molding powder, preferably heated to from 66° to 93° C., is put in a mold, which may be of the same size and shape as the curing mold, and is maintained at the temperature last given and subjected momentarily or for an interval of a few seconds to a pressure of 1000 to 2000 lbs. per square inch to cause the warm resin to cement together the particles of wood flour, the temperature and the time interval being insufficient to effect any appreciable curing of the resin. Inasmuch as the resin is uncured and the pressure is applied for so short an interval that no considerable flow of the resin takes place, the intermediate article thus made expands somewhat when removed from the mold and is lightly compacted and bibulous.

The expanded article is given a coat of a mixture of ingredients, one of which is an uncured resin and preferably the uncured or compounded resin which has been described above. Conveniently, the cold article may be dipped in a suspension of a mixture of the ingredients. The suspension may be prepared as follows. 50 parts by weight of the resin which results from the first stage of resin manufacture described above, 25 parts by weight of polymerized vinyl acetate and 25 parts by weight of a filler, such as Dixie clay, are put on a rubber mill and ground. Then, for every 100 parts of the resin there are added 10 parts of hexamethylene tetramine (the curing agent) and 2 parts of zinc stearate, the whole being ground in a ball mill and suspended in a volatile non-solvent, such for example as naphtha. The dipping of the intermediate article in this suspension is momentary, and the drying is fairly complete a few minutes after the article has been removed. The coated article may then be heated, if desired, to cause the resin to flow slightly and thereby adhere firmly to the article, or a naphtha-soluble resin, such as ester gum, rosin or the like, may be added to the suspension so that it will bond the particles of the coating to the article when the naphtha has volatilized. Methods other than dipping may be used to coat the intermediate article. For example, the article may be sprayed or brushed with the coating material and a small amount of a volatile solvent. This will result in a thick varnish on the article which may then be heated if desired, not only to drive off the solvent but also to raise the temperature of the article considerably so as to shorten the curing time in the curing mold. It should be noted, however, that coating the intermediate article by dipping it is preferred since such a procedure not only effects a saving in time, labor and apparatus over spraying or brushing but results in a coating of uniform thickness, a result more difficult to attain by the other two methods.

The intermediate article made, as has been described above, in a mold which is of the same size and shape as the curing mold and in a manner to permit it to expand, has substantially the same relative proportions as those of the finished heel but is of somewhat larger dimensions as indicated in Fig. 1. This oversize is desirable in order to obtain a smooth surface on the finished heel, since it ensures that there shall be enough pressure applied in the curing mold to impart to the surface of the heel the smoothness of the walls of the mold. In any event, however, the intermediate article should be as large as the finished heel. The general purpose of the coating 11 is to fill up the pits which otherwise result in the surface of the finally molded heel, and at the same time to provide on the heel a shell having hard sharp corners and a surface to which lacquer will adhere.

My present preference is to employ polymerized vinyl acetate as a constituent for contributing to the smoothness of appearance of the heel and for improving the adhesion of a lacquer to the smooth surface. I have found that by employing nitrocellulose lacquer and spraying it on the heel, a single application of the nitrocellulose lacquer suffices to produce a lacquered heel surface of the requisite qualities.

While nitrocellulose lacquers of widely varying composition may be employed, I give below an illustrative type of composition suitable for the purposes of the invention.

| | Parts by weight |
|---|---|
| ½ sec. nitrocellulose (dry basis) | 100 |
| "Rezyl 12H," a product of the American Cyanamid Company, and which may be described as a modified glycerylphthalate resin | 100 |
| Dibutyl phthalate | 40–50 |
| Pigment (depending on color) | 10–100 |

A thinner for the above ingredients, which is used in quantity sufficient to give the viscosity desired for spraying in a given case, is as follows:

| | Parts by weight |
|---|---|
| Ethyl acetate | 15 |
| Butyl acetate | 10 |
| Ethyl lactate | 5 |
| Butanol | 5 |
| Tuluol | 40 |
| Xylol | 25 |

Using polymerized vinyl acetate I have employed lacquers other than nitrocellulose lacquers with very satisfactory results, such as shellac lacquer, alkyd resin lacquer, and oil-soluble phenolic resin lacquer. The adhesion of these lacquers to the surface containing polymerized vinyl acetate was very satisfactory although, as is obvious, the film-forming constituents of the lacquers are of widely differing character. I have also applied to surfaces containing polymerized vinyl acetate, with operative results, lacquers which contain as the primary film-forming constituents materials such as ethyl cellulose, polymerized vinyl acetate, and chlorinated rubber. It will thus be seen that I have applied satisfactorily to surfaces containing polymerized vinyl acetate as an adhesive-promoting constituent, film-forming constituents of widely varying character.

While at present I prefer to employ polymerized vinyl acetate because of its superior properties both in contributing to the production of a very smooth molded surface on the heel and in promoting lacquer adhesion, I have obtained advantageous results by using constituents other than polymerized vinyl acetate. Thus, I have employed substances of a generally resinous character, such as garnet shellac, Vinsol, ester gum, ethyl cellulose, butyraldehyde condensation product of polyvinyl alcohol and cellulose acetate. The substances named above, like polymerized vinyl acetate, are compatible with the thermosetting resin in that they blend smoothly with the resin when mixed with it on a rubber mill and are either soluble in or softened by the solvent of the lacquer; and it is believed that these two qualities contribute to the improvement in the bonding power of the lacquer. The results, so far as smoothness and evenness of appearance of the molded surface of the heel and the adhesion of the lacquer are concerned, while in no case the same as those produced with the use of polymerized vinyl acetate, were in each case improved. Thus it will be seen that I have obtained advantageous results with bond-improving constituents of a wide variety of composition and characteristics.

The coated intermediate article is put into the curing mold and subjected to a pressure and temperature for an interval sufficient to mold it to final shape and to cure the resin, the temperature being from 150° C. to 170° C. and the pressure from 1000–2000 lbs. per square inch. There results a heel which consists of a core or center 7 of wood flour, the particles of which are held together but not impregnated to any considerable extent by the resin, and a thin shell 9 consisting largely of the resin loaded with a substance capable of improving the bonding power of the lacquer which is later to be applied. This thin continuous shell has a smooth, glossy surface which, without sanding or other preparatory treatment, can be satisfactorily finished by the application to it of a single coat of lacquer. The edges of the sharp corners of the heel, being part of this shell, are strong and without tendency to crumble; the thin shell increases the resistance to the entrance of moisture and interferes in no way with the nailing and slugging operations; and, because the cells of the particles of fibrous filler are not impregnated with the resin and can be readily collapsed, the nails and slugs do not set up strains sufficient to cause splitting or checking of the heel.

Although the invention has been set forth with particular reference to the manufacture of a nailable article, such as a heel which consists essentially of a thermosetting resin and finely divided fibrous material, it should be understood that the invention is not limited in the scope of its application to the manufacture of an article of any particular shape, nor to an article suitable for any particular use.

Having thus described my invention, what I claim as new and desire to secure by Letters Patent of the United States is:

1. The method of making a molded article which comprises intimately mixing compressible, resilient material with solid finely divided thermosetting resin which is highly viscous at its curing temperature, making from this mixture a lightly compacted intermediate article having substantially the relative proportions of the finished article but of somewhat larger dimensions by heating the mixture to a temperature and for an interval sufficient to soften the resin but not to cure it and applying pressure for a brief interval and then releasing it, whereby the resin cements together the material but permits the article to expand when the pressure is removed, and thereafter molding the expanded intermediate article under conditions of time, temperature and pressure sufficient to reduce it to finished size, and to cure the resin and thus cause the article to retain its finished size.

2. The method of making a molded article adapted to receive a lacquer which comprises intimately mixing fibrous material with thermosetting resin, forming from said mixture without curing the resin an intermediate article having substantially the relative proportions of the finished article, coating the resultant intermediate article with thermosetting resin and a resinous substance which will act to increase the bonding power of the lacquer, and pressing the intermediate article under conditions of time, temperature and pressure such that the thermosetting resin in the body of the article and in the coating is cured and the article will retain its finished shape.

3. The method of making a molded article adapted to receive a lacquer which comprises intimately mixing fibrous material with thermosetting resin, imparting to said mixture a shape having substantially the relative proportions of the finished article and without curing the resin thereby forming an intermediate article, coating the resultant intermediate article with thermosetting resin and a resinous substance which is compatible with said resin and is at least softened by the lacquer solvent, and pressing the intermediate article under conditions of time, temperature and pressure such that the thermosetting resin in the body of the article and in the coating is cured.

4. The method of making a molded article adapted to receive a lacquer which comprises intimately mixing fibrous material with uncured phenol-aldehyde resin, imparting to said mixture without curing the resin a shape having substantially the relative proportions of the finished article, thereby forming an intermediate article, coating the resultant intermediate article with a mixture of additional uncured phenol-aldehyde resin, polymerized vinyl acetate and a colloidal filler, and pressing the intermediate article thus coated under conditions of time, temperature and pressure such that the resin in the body of the article and in the coating is cured.

5. The method of making a heel which comprises intimately mixing from 5 to 35 parts by weight of solid finely divided thermosetting resin which is highly viscous at its curing temperature with from 95 to 65 parts by weight of comminuted fibrous material, making from this mixture a lightly compacted intermediate article having substantially the relative proportions of the finished heel but of somewhat larger dimensions by heating the mixture to a temperature and for an interval sufficient to soften the resin but not to cure it and applying pressure for a brief interval and then releasing it, whereby the resin cements together the fibrous material but permits the intermediate article to expand when the pressure is removed, coating the intermediate article with thermosetting resin and a colloidal filler, and molding the expanded intermediate article under conditions of time, temperature and pressure sufficient to reduce it to final dimensions and to cure the resin in the body of the article and in the coating, and thus cause the resultant heel to retain its finished size.

6. The method of making a molded heel adapted to receive a coat of lacquer which comprises intimately mixing from 5 to 35 parts by weight of solid finely divided thermosetting resin which is highly viscous at its curing temperature with from 95 to 65 parts by weight of comminuted fibrous material, making from this mixture a lightly compacted intermediate article having substantially the relative proportions of the finished heel but of somewhat larger dimensions by heating the mixture to a temperature and for an interval sufficient to soften the resin but not to cure it and applying pressure for a brief interval and then releasing it, whereby the resin cements together the fibrous material but permits the intermediate article to expand when the pressure is removed, coating the intermediate article with thermosetting resin and a resinous substance which will act in the finished heel to improve the bonding power of the lacquer, and subjecting the intermediate article thus coated to conditions of time, temperature and pressure sufficient to reduce it to final dimensions and to cure the resin in the body of the article and in the coating and thus cause the resultant heel to retain its finished size.

7. The method of making a molded heel adapted to receive a coat of lacquer which comprises intimately mixing from 20 to 10 parts by weight of solid finely divided thermosetting resin which is highly viscous at its curing temperature with from 80 to 90 parts by weight of comminuted fibrous material, making from this mixture a lightly compacted intermediate article having substantially the relative proportions of the finished heel but of somewhat larger dimensions by heating the mixture to a temperature and for an interval sufficient to soften the resin but not to cure it and applying pressure for a brief interval and then releasing it, whereby the resin cements together the fibrous material but permits the intermediate article to expand when the pressure is removed, coating the intermediate article with thermosetting resin and a substance which is soluble in the solvent of the lacquer, and subjecting the intermediate article thus coated to conditions of time, temperature and pressure sufficient to reduce it to final dimensions and to cure the resin in the body of the article and in the coating and thus cause the resultant heel to retain its finished size.

8. A molded heel which can readily be nailed in place in a shoe and is capable, as molded, of firmly holding a coat of lacquer, said heel comprising essentially 10 to 20 parts by weight of cured phenol-aldehyde resin and 90 to 80 parts by weight of finely divided fibrous material and having on its surface phenol-aldehyde resin and a vinyl resin which is compatible with the phenol-aldehyde resin and is at least softened by the solvent of the lacquer.

9. A molded lacquered article, said article comprising a core of cured resin and finely divided fibrous material, a shell of resin containing a lacquer bonding substance, and a coating of lacquer on the shell.

10. The method of coating an intermediate article which contains an uncured resin and is to be subjected to heat and pressure to produce a finished article ready to be lacquered, said method comprising coating the intermediate article with a suspension, in a non-solvent volatile liquid, of uncured resin and a substance which will act in the finished article to increase the bonding power of the lacquer, and causing the liquid to evaporate.

11. The method of making a molded article which comprises making from a dry mixture of fibrous material and finely divided thermosetting resin a lightly compacted, bibulous, intermediate article in which the resin is uncured, said intermediate article resembling the shape of but being larger than the desired finished article, coating the intermediate article by dipping it in a suspension of substances including a thermosetting resin, and subjecting the coated intermediate article to conditions of time, temperature and pressure sufficient to reduce it to final dimensions and to cure the resin in the body portion of the article and in the coating.

12. The method of making a molded article which comprises making from a dry mixture of fibrous material and finely divided thermosetting resin a lightly compacted, bibulous intermediate article resembling the shape of but being larger than the desired finished article by placing the mixture in a mold, subjecting it to conditions of time, temperature and pressure for an interval and to a degree sufficient to soften the resin but not to cure it, releasing the pressure whereupon the intermediate articles expands, removing it from the mold, coating it by dipping it in a suspension of substances including a thermosetting resin, placing the coated intermediate article in a mold of the same size and shape as the first-mentioned mold, and subjecting the coated, expanded intermediate articles to conditions of time, temperature and pressure sufficient to reduce it to final size and to cure the resin both in the body portion and in the coating.

13. A molded article adapted to receive nails without splitting and having a surface which is smooth and ready to receive a coat of lacquer, said article consisting of a core of from 10 to 20 parts by weight of cured phenol-aldehyde resin and 90 to 80 parts by weight of finely divided fibrous material, and a thin shell of cured resin having therein a colloidal filler which contributes to the smoothness of the surface of the shell and a substance compatible with the resin and soluble in the solvent of the lacquer which ensures that the lacquer when applied shall be firmly adherent.

14. A molded heel which can readily be nailed in place in a shoe and is capable, as molded, of firmly holding a coat of lacquer, said heel comprising essentially 10 to 20 parts by weight of cured phenol-aldehyde resin and 90 to 80 parts by weight of finely divided fibrous material and having on its surface phenol-aldehyde resin and vinyl acetate.

15. The method of making a molded article adapted to receive a lacquer which comprises making from a dry mixture of fibrous material and finely divided thermosetting resin a lightly compacted, bibulous, intermediate article in which the resin is uncured, the intermediate article resembling the shape of but being larger than the desired finished article, coating the intermediate article by dipping it in a suspension containing thermosetting resin and a substance which is at least softened by the solvent of the lacquer, and subjecting the coated intermediate article to conditions of time, temperature and pressure sufficient to reduce it to final dimensions and to cure the resin in the body portion of the article and in the coating.

THOMAS C. MORRIS.